(12) United States Patent
So et al.

(10) Patent No.: US 11,430,215 B2
(45) Date of Patent: Aug. 30, 2022

(54) ALERTS OF MIXED REALITY DEVICES

(71) Applicant: Hewlett-Packard Development Company, L.P., Spring, TX (US)

(72) Inventors: Chi So, Spring, TX (US); Juan Martinez, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/040,095

(22) PCT Filed: Jun. 20, 2018

(86) PCT No.: PCT/US2018/038539
§ 371 (c)(1),
(2) Date: Sep. 22, 2020

(87) PCT Pub. No.: WO2019/245550
PCT Pub. Date: Dec. 26, 2019

(65) Prior Publication Data
US 2021/0027063 A1    Jan. 28, 2021

(51) Int. Cl.
| | |
|---|---|
| *G06V 20/20* | (2022.01) |
| *G06V 40/10* | (2022.01) |
| *G06V 40/16* | (2022.01) |
| *G08B 3/00* | (2006.01) |
| *G08B 5/00* | (2006.01) |
| *G08B 6/00* | (2006.01) |

(52) U.S. Cl.
CPC .............. *G06V 20/20* (2022.01); *G06V 40/10* (2022.01); *G06V 40/161* (2022.01); *G06V 40/172* (2022.01); *G08B 3/00* (2013.01); *G08B 5/00* (2013.01); *G08B 6/00* (2013.01)

(58) Field of Classification Search
None
See application file for complete search history.

(56) References Cited

U.S. PATENT DOCUMENTS

| | | |
|---|---|---|
| 5,900,849 A | 5/1999 | Gallery |
| 9,552,676 B2 | 1/2017 | Wong et al. |
| 11,190,753 B1 | 11/2021 | Meier |
| 2005/0091213 A1 | 4/2005 | Schutz et al. |
| 2008/0266079 A1 | 10/2008 | Lontka |
| 2011/0115816 A1 | 5/2011 | Brackney |
| 2013/0293586 A1 | 11/2013 | Kaino et al. |
| 2014/0225978 A1 | 8/2014 | Saban et al. |
| 2016/0027212 A1 | 1/2016 | Da Veiga et al. |
| 2016/0124502 A1 | 5/2016 | Sawyer et al. |
| 2016/0127931 A1 | 5/2016 | Baxley et al. |
| 2017/0053440 A1 | 2/2017 | Yoon et al. |

(Continued)

FOREIGN PATENT DOCUMENTS

| | | |
|---|---|---|
| CN | 202502598 | 10/2012 |
| CN | 112005282 A | 11/2020 |

(Continued)

*Primary Examiner* — Nicholas R Wilson
(74) *Attorney, Agent, or Firm* — Brooks Cameron & Huebsch PLLC

(57) ABSTRACT

In some examples, a system for alerts of mixed reality (MR) devices includes a receiver engine to receive an input from a sensor of a MR device in response to the sensor detecting a person in an environment in which the MR device is located, and a generator engine to cause the MR device to generate an alert in response to the detected person based on an identity of the detected person.

13 Claims, 4 Drawing Sheets

(56) References Cited

U.S. PATENT DOCUMENTS

| | | |
|---|---|---|
| 2017/0123747 A1 | 5/2017 | Rochford et al. |
| 2017/0287215 A1 | 10/2017 | Lalonde et al. |
| 2017/0322715 A1 | 11/2017 | Cohrt |
| 2018/0012074 A1 | 1/2018 | Holz et al. |
| 2018/0018862 A1 | 1/2018 | Kerzner |
| 2018/0095542 A1 | 4/2018 | Mallinson |

FOREIGN PATENT DOCUMENTS

| | | |
|---|---|---|
| RU | 2370817 | 10/2009 |
| WO | WO201201720 | 1/2012 |
| WO | 2012/101720 A1 | 8/2012 |
| WO | 2016/120806 A1 | 8/2016 |
| WO | WO-WO2017031089 | 2/2017 |
| WO | WO2018022523 | 2/2018 |
| WO | WO-2018022523 | 2/2018 |

ALERTS OF MIXED REALITY DEVICES

BACKGROUND

Head mounted mixed reality (MR) devices may be used to provide an altered reality to a user. A MR device may include a virtual reality (VR) device and/or an augmented reality (AR) device. MR devices may include displays to provide a "virtual and/or augmented" reality experience to the user by providing video, images, and/or other visual stimuli to the user via the displays. MR devices may include audio output devices to provide audible stimuli to the user to further the virtual reality experienced by the user. MR devices may be worn by a user.

DETAILED DESCRIPTION

MR devices can be head mounted devices. As used herein, the term "MR device" refers to a device that provides a virtual reality to a user. As used herein, the term "mixed reality" refers to a computing device generated scenario that simulates experience through senses and perception. In some examples, a MR device may cover a user's eyes and provide visual stimuli to the user via a display, thereby substituting a "mixed" reality (e.g., a "virtual reality" and/or "augmented reality") for actual reality. In some examples, a MR device may cover a user's ears and provide audible stimuli to the user via audio output devices to enhance the virtual reality experienced by the user. In some examples, a MR device may provide an overlay transparent or semi-transparent screen in front of a user's eyes such that reality is "augmented" with additional information such as graphical representations and/or supplemental data. For example, an MR device may overlay transparent or semi-transparent weather information, directions, and/or other information on an MR display for a user to examine.

As a result of MR devices covering a user's eyes and/or ears, the user may be immersed in the virtual reality created by a MR device. The immersive MR experience can allow the user to experience a virtual reality with realistic images, sounds, and/or other sensations.

However, in order to provide the immersive virtual reality experience, the user's eyes and/or ears may be covered by the MR device. As a result, the user may not be aware of the user's physical surrounding environment. As used herein, the term "environment" refers to a space in which the MR device is located that includes an aggregate of surrounding things, conditions, and/or influences in the space. For example, the environment may be a room in a building having furniture, electronics, lighting, etc., and may include doors and/or windows through which other people or animals (e.g., pets) may enter/exit. Due to the immersive capabilities of MR devices, a user may not be aware of the surrounding things (e.g., furniture, electronic devices, eta), people, and/or animals that may enter/traverse the space.

Alerts of virtual reality devices can allow for a user to be alerted to persons detected by the MR device. A user who is immersed in a MR experience can be alerted to the presence of a detected person. As a result, the user of the MR device can be more aware of the environment outside of the MR experience.

Figure 1:
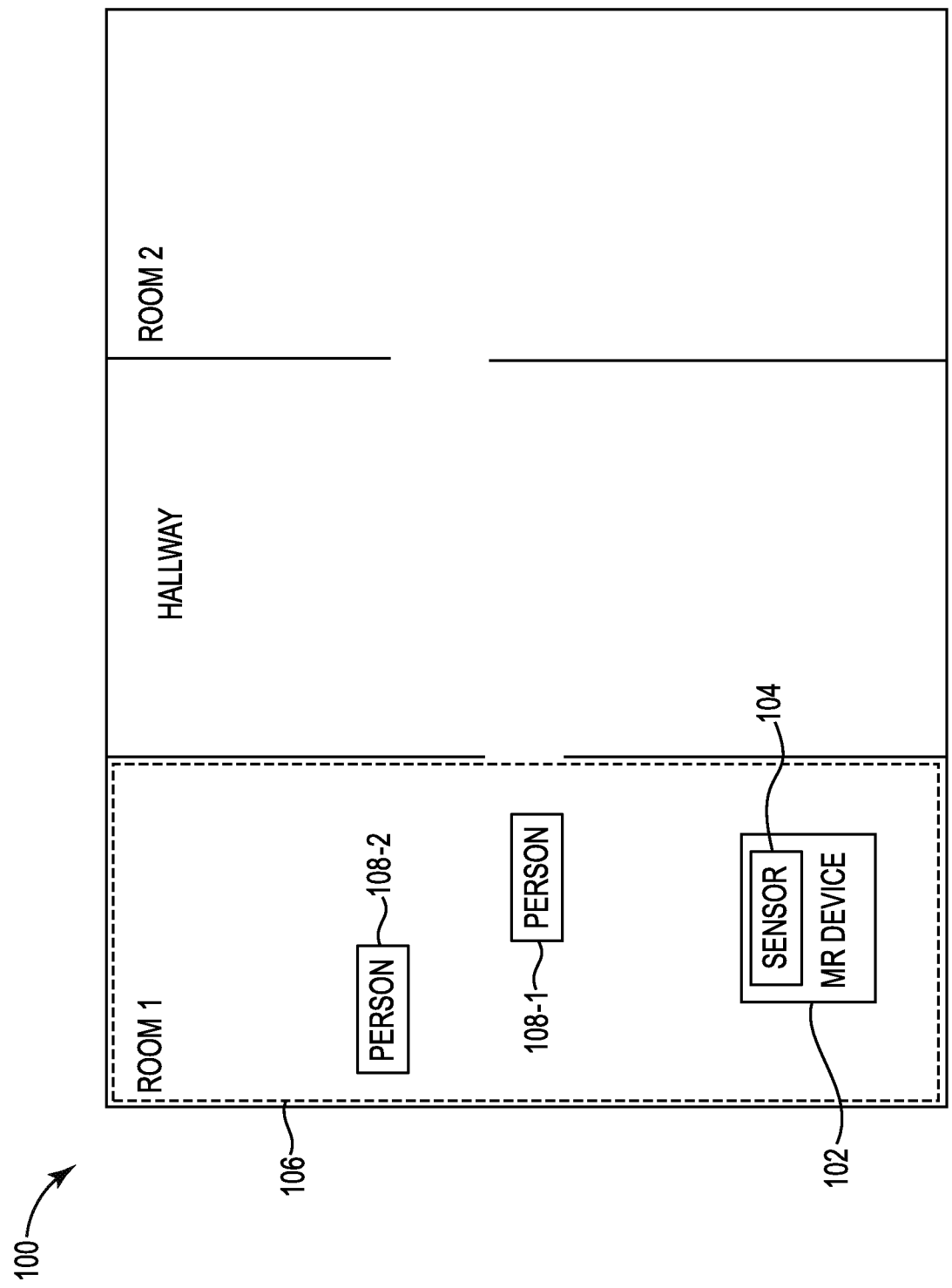
FIG. 1 illustrates an example of a building suitable for alerts of virtual reality devices consistent with the disclosure.

FIG. 1 illustrates an example of a building 100 suitable for alerts of virtual reality devices consistent with the disclosure. Building 100 can include a MR device 102, sensor 104, environment 106, and person 108-1, 108-2.

As illustrated in FIG. 1, MR device 102 can be located in building 100. Specifically, MR device 102 can be located in Room 1 of building 100. A user may be utilizing MR device 102 in order to experience a "virtual and/or augmented reality" in Room 1 of building 100. For example, building 100 can be a residential home and Room 1 may be a common area in the residential home. A user may utilize MR device 102 to experience a "virtual and/or augmented reality" while being located in Room 1 of building 100. As used herein, "a" can refer to one such thing or more than one such thing.

MR device 102 can include sensor 104. As used herein, the term "sensor" refers to a device that can transmit a signal in response to a stimulus. For example, sensor 104 can transmit a signal in response to light, motion, audio, visual, and/or other stimuli, as is further described herein.

Although sensor 104 is described above as being included in MR device 102, examples of the disclosure are not so limited. For example, sensor 104 can be a sensor that is remotely located from MR device 102.

A controller can receive an input from sensor 104. Although not illustrated in FIG. 1 for clarity and so as not to obscure examples of the disclosure, the controller can be included in MR device 102. However, examples of the disclosure are not so limited. For example, the controller can be located remotely from MR device 102, In such an example in which the controller is located remotely from MR device 102, the controller can receive the input from sensor 104 via a network relationship. The network relationship can be a wired network relationship or a wireless network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, a Bluetooth network relationship, and/or the Internet, among other types of network relationships.

Although not illustrated in FIG. 1 for clarity and so as not to obscure examples of the disclosure, the controller of MR device 102 can include a processing resource and a memory resource. The processing resource may be a central processing unit (CPU), a semiconductor based microprocessor, and/or other hardware devices suitable for retrieval and execution of machine-readable instructions stored in a memory resource. The processing resource may fetch, decode, and execute the instructions. As an alternative or in addition to retrieving and executing the instructions, the processing resource may include a plurality of electronic circuits that include electronic components for performing the functionality of the instructions.

The memory resource may be any electronic, magnetic, optical, or other physical storage device that stores executable instructions and/or data. Thus, the memory resource may be, for example, Random Access Memory (RAM), an Electrically-Erasable Programmable Read-Only Memory (EEPROM), a storage drive, an optical disc, and the like. The memory resource may be disposed within the controller of MR device 102. Additionally and/or alternatively, the memory resource may be a portable, external or remote storage medium, for example, that allows the controller to download the instructions from the portable/external/remote storage medium.

As described above, sensor 104 can transmit a signal in response to a stimulus. In some examples, sensor 104 can be a camera. As used herein, the term "camera" refers to a device to record or capture images, where the images can be still photographs or sequences of images constituting videos. For example, sensor 104 can capture image(s) in an environment in which sensor 104 (and correspondingly, MR device 102) is located.

Although MR device 102 is illustrated in FIG. 1 as including a single sensor 104, examples of the disclosure are not so limited. For example, VR device 102 can include more than one sensor.

As described above, sensor 104 can be a camera. In some examples, sensor 104 can be an infrared (IR) camera. As used herein, the term "IR camera" refers to a camera that captures and forms an image using infrared radiation. For example, sensor 104 can be an IR camera that can detect a person in environment 106, as is further described herein.

Although sensor 104 is described as including an IR camera, examples of the disclosure are not so limited. For example, sensor 104 can be a Time of Flight (ToF) camera, passive infrared camera, light-field camera, mobile camera, among other types of cameras.

As described above, the controller of MR device 102 can receive an input from a camera in response to the camera detecting the presence of a person 108-1, 108-2 in environment 106 in which MR device 102 is located. For example, a user may be utilizing MR device in Room 1 (e.g., environment 106) of building 100 when persons 108-1 and/or 108-2 enter environment 106. The user of MR device 102 may not realize persons 108-1 and/or 108-2 have entered environment 106. Alerts of MR devices can aid a user being aware of their surroundings outside of the "virtual and/or augmented reality" provided to the user by MR device 102, as is further described herein.

The controller can determine an identity of persons 108-1 and/or 108-2 detected in environment 106. For example, the controller can determine who person 108-1 is and who person 108-2 is. In other words, the controller can distinguish between the identities of person 108-1, 108-2, and/or any other person who may enter environment 106.

The controller can determine the identity of persons 108-1 and/or 108-2 by the camera via facial recognition. As used herein, the term "facial recognition" refers to the capability to identify a person from an image (e.g., a digital image) or sequence of images (e.g., a video) by utilizing facial features of the person. The facial features of the person can be detected utilizing the camera of MR device 102. For example, the sensor 104 of MR device 102 can be an IR camera that can detect facial features of person 108-1, 108-2. The IR camera can detect persons 108-1, 108-2 in environment 106 via facial recognition.

The IR camera of MR device 102 can send a signal including detected facial features of persons 108-1 and/or 108-2 to the controller of MR device 102, The controller of MR device 102 can compare the detected facial features of persons 108-1 and/or 108-2 to facial features included in a database. Although not illustrated in FIG. 1 for clarity and so as not to obscure examples of the disclosure, the controller can be connected to the database via a wired or wireless network relationship.

For example, the controller of MR device 102 can receive a signal including an image with detected facial features of person 108-1 and/or 108-2. The detected facial features can include, in some examples, relative position, size, and/or shape of person 108-1 and/or 108-2's eyes, nose, cheekbones, jaw, among other types of facial features. The controller can compare the detected facial features with facial features included in the database. For instance, the controller can compare the relative position, size, and/or shape of person 108-1 and/or 108-2's eyes, nose, cheekbones, and/or jaw, with the relative position, size, and/or shape of eyes, nose, cheekbones, and/or jaw included in the database. If the detected facial features of person 108-1 and/or 108-2 match those facial features included in the database, the controller can determine the identity of person 108-1 and/or 108-2.

In some examples, sensor 104 can be a wireless communication device. As used herein, the term "wireless communication device" refers to a device which includes the ability to transfer information between itself and another point, where the wireless communication device and the other point are not connected by an electrical conductor. For example, the wireless communication device can transfer information via electromagnetic wireless technologies, such as Bluetooth, Wi-Fi, radio-frequency (RF), mobile telecommunication including Long-Term Evolution (LIE), LTE Advanced, among other types of wireless communication technologies.

The controller of MR device 102 can receive an input from the wireless communication device. For example, person 108-1 may walk into environment 106, where person 108-1 is carrying a mobile device. As used herein, the term "mobile device" refers to a device that is (or can be) carried and/or worn by a user. Examples of a mobile device can include a phone (e.g., a smart phone), tablet, a personal digital assistant (PDA), smart glasses, and/or a wrist-worn device (e.g., a smart watch), among other types of mobile devices. Person 108-1's mobile device may communicate with the wireless communication device (e.g., sensor 104) of MR device 102. For example, person 108-1's mobile device can communicate a media access control (MAC) address of person 108-1's mobile device to sensor 104 of MR device 102.

The controller can determine the identity of person 108-1 based on the input from sensor 104. For example, the controller can compare the MAC address received by sensor 104 from person 108-1's mobile device with MAC addresses stored in a database. Based on the comparison, the controller can determine the identity of person 108-1. In other words, if the MAC address of person 108-1's mobile device, received by sensor 104 of MR device 102, matches a MAC address in a database, the controller can determine the identity of person 108-1.

The controller can generate, based on the determined identity of person 108-1 and/or 108-2, an alert in response to the detected person 108-1 and/or 108-2. The alert can include a visual alert, an audio alert, and/or a haptic feedback alert, among other types of alerts, as is further described herein.

The controller can generate the alert in response to person 108-1 and/or person 108-2 being within a threshold distance of MR device 102. As illustrated in FIG. 1, persons 108-1 and 108-2 can be in environment 106. As an example, person 108-1 can be one meter away from MR device 102 and person 108-2 can be four meters away from MR device 102.

The controller can generate the alert in response to person 108-1 in response to person 108-1 being within two meters of MR device 102, but refrain from generating the alert in response to person 108-2 being four meters away from MR device 102.

The threshold distance can be predetermined and/or adjustable. For example, as described above, the threshold distance can be two meters. However, the user of MR device 102 may move to a different room in building 100. For instance, the user of MR device 102 may move to Room 2 of building 100. Room 2 may be different than Room 1 (e.g., Room 2 may have a different layout, furniture, electronic devices, etc.) Therefore, the threshold distance can be adjusted based on the room. For example, the threshold distance may be adjusted for Room 2 to be three meters.

Although the threshold distance is described above as being adjustable between being two meters or three meters, examples of the disclosure are not so limited. For example, the threshold distance can be adjustable to be less than two meters or greater than two meters.

As described above, the controller can generate the alert in response to the determined identity of person 108-1 and/or 108-2. In some examples, the controller can generate the alert in response to the determined identity of person 108-1 being that of a first person, and/or refraining from generating the alert in response to the determined identity of person 108-1 being that of a second person. For example, the user of MR device 102 may be at home with a roommate, significant other, etc. The controller can generate the alert in response to the determined identity of person 108-1 being the user of MR device 102's wife, but refrain from generating the alert in response to the determined identity of person 108-1 being the roommate of the user of MR device 102.

In some examples, the controller can generate the alert in response to the controller not determining the identity of the person via facial recognition. For example, as described above, the controller can compare the detected facial features of person 108-1 with facial features included in the database. In response to the controller finding the detected facial features of person 108-1 do not match any facial features of persons included in the database, the controller can generate the alert. As a result of the user being immersed in the "virtual and/or augmented reality" created by MR device 102, the user may not know that person 108-1 is a burglar or other person unauthorized to be in building 100. In such an example, the user of MR device 102 can be alerted to the presence of person 108-1 for safety reasons.

The controller can cause the alert to be visually displayed via a display of MR device 102. As used herein, the term "display" refers to a device to visually present information to a user. Continuing with the example above, sensor 104 can be a camera that detects persons 108-1 and/or 108-2 in environment 106. The controller can cause the alert (e.g., the presence of persons 108-1 and/or 108-2) to be displayed visually on the display of MR device 102. Included in the visually displayed alert can be alert details. For example, the alert details can include the determined identity of person 108-1 and/or 108-2. In some examples, alert details can include a direction of the detected persons 108-1 and/or 108-2 and/or a distance from MR device 102 to persons 108-1 and/or 108-2, as is further described herein.

In some examples, the visually displayed alert can include a direction of the detected persons 108-1 and/or 108-2 from MR device 102 relative to the orientation of MR device 102. As used herein, the term "orientation" refers to a position of MR device 102 in relation to its surroundings in building 100. For example, the orientation of MR device 102 can refer to the direction MR device 102 is facing in environment 106. For instance, MR device 102 can be facing away (e.g., in a direction "down" as illustrated in FIG. 1) from persons 108-1 and/or 108-2 as oriented in FIG. 1. The visually displayed alert on the display of MR device 102 can include the direction of persons 108-1 and/or 108-2 from MR device 102 based on the orientation of MR device 102, where the direction displayed on the display of MR device 102 can indicate to the user of MR device 102 that persons 108-1 and/or 108-2 are in an opposite direction (e.g., "up" as illustrated in FIG. 1) to the orientation of MR device 102 in environment 106.

In some examples, the display of MR device 102 can display the distance from MR device 102 to detected persons 108-1 and/or 108-2. For example, the alert details can include the detected persons 108-1 and/or 108-2, and the controller can determine the location of the detected persons 108-1 and/or 108-2 relative to the location of MR device 102. Based on the location of the MR device 102 and the location of detected persons 108-1 and/or 108-2, the display of MR device 102 can display the distance from MR device 102 to the detected persons 108-1 and/or 108-2.

The controller can cause the alert to be an audio alert. The audio alert can be an audible alert emitted by an audio output device of MR device 102. As used herein, the term "audio output device" refers to a device capable of converting electrical signals to sound and/or pressure waves. In some examples, the audio output device can be a speaker. As used herein, the term "speaker" refers to a device such as an electroacoustic transducer which can convert an electrical signal to an audio output such as sound and/or pressure waves. For example, the audio alert can be an audible sound emitted by a speaker or speakers included with MR device 102.

Similar to the visually displayed alert, the audio alert can include alert details. For example, audio output devices of MR device 102 can audibly emit sounds describing the identity of detected persons 108-1 and/or 108-2 (if able to be determined), the direction of detected persons 108-1 and/or 108-2 from MR device 102 relative to the orientation of MR device 102, and/or the distance of MR device 102 from detected persons 108-1 and/or 108-2, among other types of alert details.

The controller can cause the alert to be a haptic feedback alert. As used herein, the term "haptic" refers to a mechanical stimulation such as a vibration to a user. For example, the haptic feedback alert can be a mechanical stimulation to a user to inform the user of the alert. The haptic feedback alert can be a vibrational alert by mechanical stimulation via vibrating pads of MR device 102.

Since a MR experience can be immersive, a user may not always be situationally aware of the presence of other persons located near them. Alerts of virtual reality devices can provide a user with understanding of the user's surroundings outside of the "virtual and/or augmented reality" provided by MR device 102. The alerts can allow for an immersive MR experience, while also providing for safe operation of the MR device and awareness of the surrounding environment.

Figure 2:
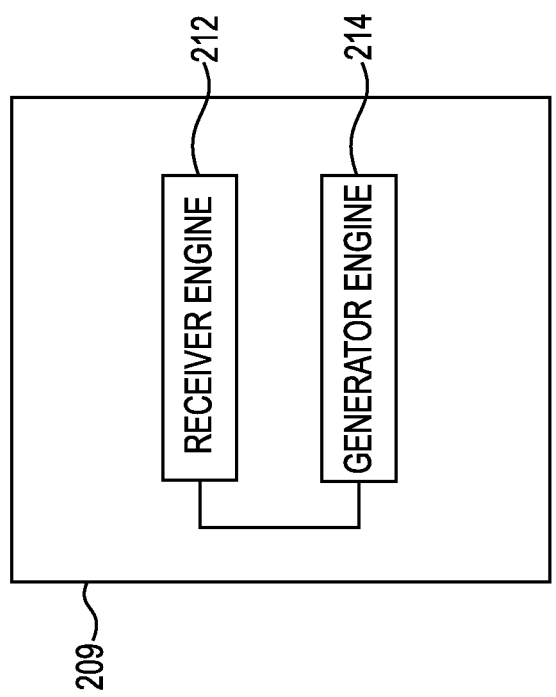
FIG. 2 illustrates an example of a system for alerts of virtual reality devices consistent with the disclosure.

FIG. 2 illustrates an example of a system 209 for alerts of virtual reality devices consistent with the disclosure. The system 209 can include a plurality of engines (receiver engine 212, generator engine 214). The system 209 can include additional or fewer engines that are illustrated to perform the various elements as described in connection with FIG. 1.

The plurality of engines (e.g., receiver engine 212, generator engine 214) can include a combination of hardware and machine-readable instructions (e.g., stored in a memory resource such as a non-transitory machine-readable medium) that are executable using hardware components such as a processor, but at least hardware, to perform elements described herein (e.g., receive an input from a sensor of a MR device in response to the sensor detecting a person in an environment in which the MR device is located, cause the MR device to generate an alert in response to the detected person based on an identity of the detected person, etc.)

The receiver engine 212 can include hardware and/or a combination of hardware and machine-readable instructions, but at least hardware, to receive an input from a sensor of a MR device in response to the sensor detecting a person in an environment in which the MR device is located. The sensor can be a camera. For example, the sensor can be an IR camera, ToF camera, passive infrared camera, light-field camera, mobile camera, among other types of cameras.

Although not illustrated in FIG. 2 for clarity and so as not to obscure examples of the disclosure, system 209 can include a determine engine. The determine engine can include hardware and/or a combination of hardware and machine-readable instructions, but at least hardware, to determine the identity of the person via facial recognition. For example, the determine engine can receive an input from the sensor including facial features of a detected person and compare the detected facial features with facial features included in database 210. Based on the comparison, the determine engine can determine the identity of the person.

The generator engine 214 can include hardware and/or a combination of hardware and machine-readable instructions, but at least hardware, to cause a MR device to generate an alert in response to the detected person based on an identity of the detected person. The alert can include a visual alert, an audio alert, and/or a haptic feedback alert, among other types of alerts.

Figure 3:
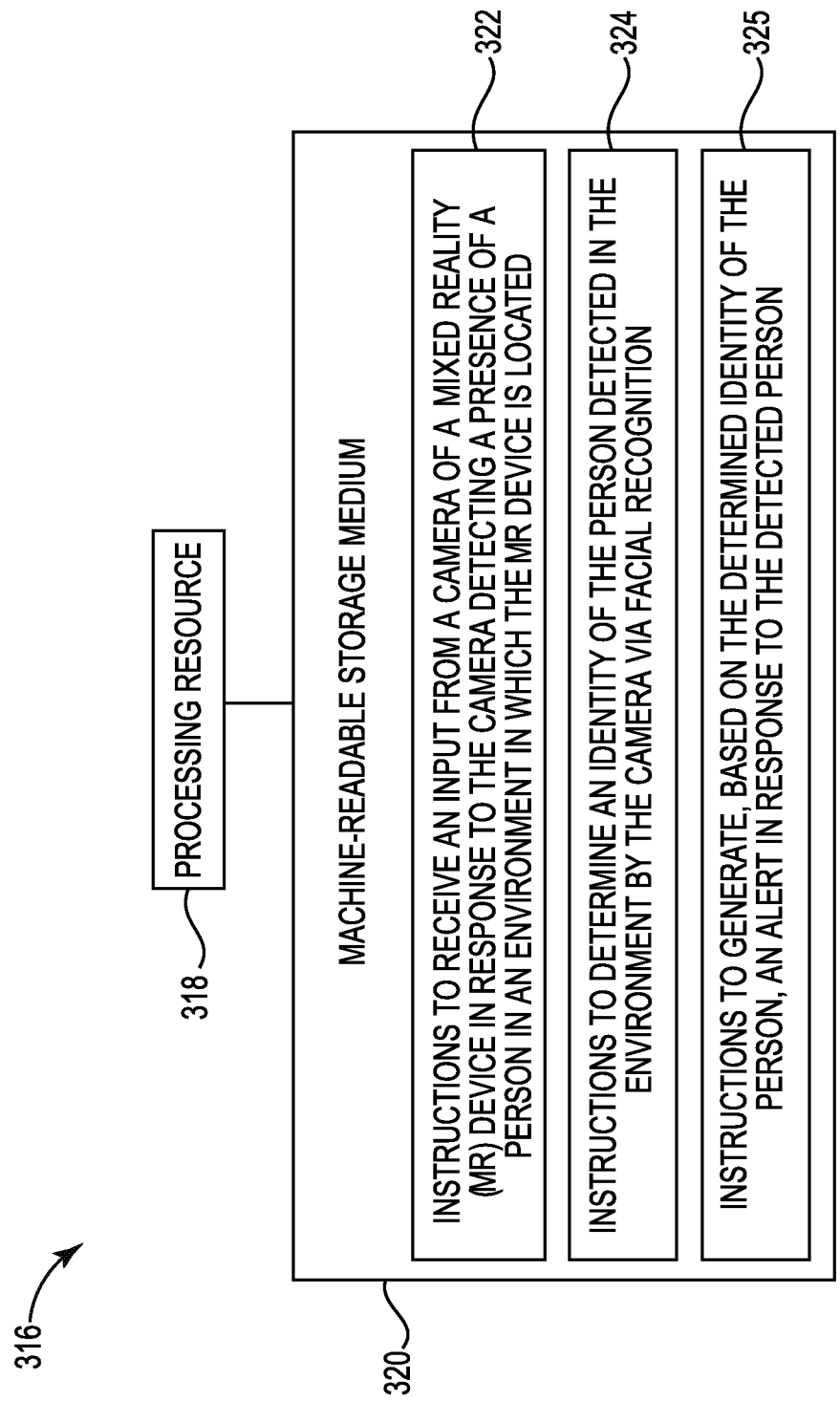
FIG. 3 illustrates a block diagram of an example of a system suitable for alerts of virtual reality devices consistent with the disclosure.

FIG. 3 illustrates a block diagram of an example of a system 316 suitable for alerts of virtual reality devices consistent with the disclosure. In the example of FIG. 3, system 316 includes a processing resource 318 and a machine-readable storage medium 320. Although the following descriptions refer to an individual processing resource and an individual machine-readable storage medium, the descriptions may also apply to a system with multiple processing resources and multiple machine-readable storage mediums. In such examples, the instructions may be distributed across multiple machine-readable storage mediums and the instructions may be distributed across multiple processing resources. Put another way, the instructions may be stored across multiple machine-readable storage mediums and executed across multiple processing resources, such as in a distributed computing environment.

Processing resource 318 may be a central processing unit (CPU), microprocessor, and/or other hardware device suitable for retrieval and execution of instructions stored in machine-readable storage medium 320. In the particular example shown in FIG. 3, processing resource 318 may receive, determine, and send instructions 322, 324, and 325. As an alternative or in addition to retrieving and executing instructions, processing resource 318 may include an electronic circuit comprising an electronic component for performing the operations of the instructions in machine-readable storage medium 320. With respect to the executable instruction representations or boxes described and shown herein, it should be understood that part or all of the executable instructions and/or electronic circuits included within one box may be included in a different box shown in the figures or in a different box not shown.

Machine-readable storage medium 320 may be any electronic, magnetic, optical, or other physical storage device that stores executable instructions. Thus, machine-readable storage medium 320 may be, for example, Random Access Memory (RAM), an Electrically-Erasable Programmable Read-Only Memory (EEPROM), a storage drive, an optical disc, and the like. The executable instructions may be "installed" on the system 316 illustrated in FIG. 3. Machine-readable storage medium 320 may be a portable, external or remote storage medium, for example, that allows the system 316 to download the instructions from the portable/external/remote storage medium. In this situation, the executable instructions may be part of an "installation package". As described herein, machine-readable storage medium 320 may be encoded with executable instructions related to alerts of virtual reality devices. That is, using processing resource 318, machine-readable storage medium 320 may cause a MR device to generate an alert in response to a detected person, among other operations.

Instructions 322, when executed by processing resource 318, may cause system 316 to receive an input from a camera of a mixed reality (MR) device in response to the camera detecting a presence of a person in an environment in which the MR device is located. The camera can be an IR camera, a ToF camera, a passive infrared camera, a light-field camera, a mobile camera, among other types of cameras.

Instructions 324, when executed by processing resource 318, may cause system 316 to determine an identity of the person detected in the environment by the camera via facial recognition. For example, processing resource 318 can cause system 316 to compare detected facial features with facial features included in a database. Based on the comparison, the system 316 can determine the identity of the person.

Figure 4:
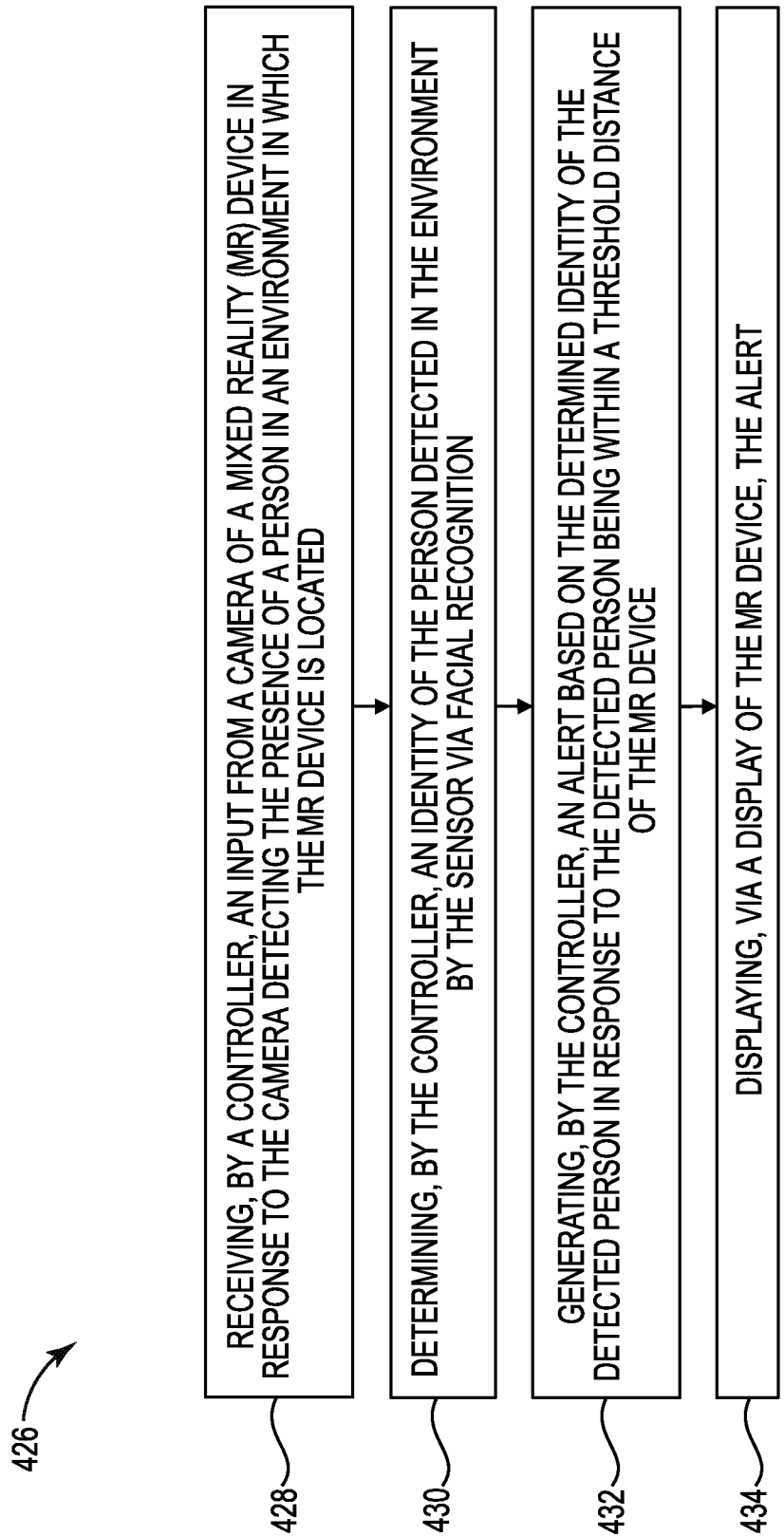
FIG. 4 illustrates an example of a method for alerts of virtual reality devices consistent with the disclosure.

Instructions 325, when executed by processing resource 318, may cause system 316 to generate, based on the determined identity of the person, an alert in response to the detected person. The alert can include a visual alert, an audio alert, and/or a haptic feedback alert, among other types of alerts FIG. 4 illustrates an example of a method 426 for alerts of virtual reality devices consistent with the disclosure. For example, method 426 can be performed by a controller of a MR device (e.g., MR device 102, previously described in connection with FIG. 1) to generate an alert in response to detecting the presence of a person, among other operations.

At 428, the method 426 includes receiving, by a controller, an input from a camera of a MR device in response to the camera detecting the presence of a person in an environment in which the MR device is located. The camera can be an IR camera, a ToF camera, a passive infrared camera, a light-field camera, a mobile camera, among other types of cameras.

At 430, the method 426 includes determining, by the controller, an identity of the person detected in the environment by the sensor via facial recognition. For example, the method can include comparing detected facial features of the detected person with facial features included in a database. Based on the comparison, the identity of the person can be determined.

At 432, the method 426 includes generating, by the controller, an alert based on the determined identity of the detected person in response to the detected person being within a threshold distance of the MR device. The alert can include a visual alert, an audio alert, and/or a haptic feedback alert, among other types of alerts.

At 434, the method 426 includes visually displaying, via a display of the MR device, the alert. For example, the display of the MR device can display the alert including a direction of the detected person and/or a distance from the MR device to the detected person, among other types of alert details.

The above specification, examples, and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. A mixed reality (MR) device, comprising:
   a sensor; and
   a controller including:
      a processing resource; and
      a non-transitory machine-readable storage medium storing instructions executable by the processing resource to:
         receive an input from the sensor in response to the sensor detecting a person in a room of an environment in which the MR device is located; and
         cause the MR device to generate an alert in response to the detected person based on an identity of the detected person and in response to the person being within a threshold distance of the MR device, wherein:
            in response to the room being a first room, the threshold distance is a first distance; and
            in response to the room being a second room different from the first room, the threshold distance is a second distance different from the first distance.

2. The MR device of claim 1, wherein the sensor detects the person in the environment via facial recognition.

3. The MR device of claim 2, including instructions to cause the processing resource to determine the identity of the person via the facial recognition.

4. The MR device of claim 1, wherein the sensor is a camera.

5. The MR device of claim 4, wherein the camera is an infrared (IR) camera.

6. The MR device of claim 1, wherein the alert includes at least one of:
   a visual alert;
   an audio alert; and
   a haptic feedback alert.

7. A non-transitory machine-readable storage medium having stored thereon machine-readable instructions to cause a processing resource to:
   receive an input from a camera of a mixed reality (MR) device in response to the camera detecting a presence of a person in a room of an environment in which the MR device is located;
   determine an identity of the person detected in the environment by the camera via facial recognition; and
   generate, based on the determined identity of the person, an alert in response to the detected person and in response to the person being within a threshold distance of the MR device, wherein:
      in response to the room being a first room, the threshold distance is a first distance; and
      in response to the room being a second room different from the first room, the threshold distance is a second distance different from the first distance.

8. The medium of claim 7, wherein the instructions to generate the alert include instructions to cause the processing resource to:
   generate the alert in response to the determined identity being that of a first person; and
   refrain from generating the alert in response to the determined identity being that of a second person.

9. The medium of claim 7, wherein:
   the alert is a visual alert; and
   further comprising instructions to cause the processing resource to display the visual alert on a display of the MR device, wherein the displayed alert includes at least one of:
      a direction of the person from the MR device relative to an orientation of the MR device in the environment; and
      a distance of the person from the MR device.

10. A method, comprising:
    receiving, by a controller, an input from a camera of a mixed reality (MR) device in response to the camera detecting the presence of a person in a room of an environment in which the MR device is located;
    determining, by the controller, an identity of the person detected in the environment by the sensor via facial recognition;
    generating, by the controller, an alert based on the determined identity of the detected person in response to the detected person being within a threshold distance of the MR device, wherein:
       in response to the room being a first room, the threshold distance is a first distance; and
       in response to the room being a second room different from the first room, the threshold distance is a second distance different from the first distance; and
    displaying, via a display of the MR device, the alert.

11. The method of claim 10, wherein the method includes displaying, via the display of the MR device, a direction of the detected person from the MR device.

12. The method of claim 10, wherein the method includes displaying, via the display of the MR device, a distance from the detected person to the MR device.

13. The method of claim 10, wherein generating the alert further includes at least one of:
    generating a haptic feedback alert; and
    generating an audio alert.

* * * * *